United States Patent
Kang et al.

(10) Patent No.: US 6,934,566 B2
(45) Date of Patent: Aug. 23, 2005

(54) WIRELESS COMMUNICATION DEVICE AND CONTROLLING METHOD THEREOF

(75) Inventors: Hyun-Sook Kang, Yongin (KR); Tae-Jin Lee, Anyang (KR); Jong-Hun Park, Kwacheon (KR); Kyung-Hun Jang, Suwon (KR)

(73) Assignee: Samsung Electronics Co., LTD, Kyungki-do (KR)

( * ) Notice: Subject to any disclaimer, the term of this patent is extended or adjusted under 35 U.S.C. 154(b) by 612 days.

(21) Appl. No.: 09/972,957

(22) Filed: Oct. 10, 2001

(65) Prior Publication Data

US 2002/0082060 A1 Jun. 27, 2002

(30) Foreign Application Priority Data

Dec. 21, 2000 (KR) ........................................ 2000-79434

(51) Int. Cl.⁷ ............................. H04M 1/00; H04J 3/24; H04J 3/08; H04Q 7/00
(52) U.S. Cl. ....................... 455/574; 370/312; 370/313; 370/326
(58) Field of Search ............................... 455/3.01, 3.02, 455/3.03, 3.05, 574; 379/92.01, 92.03, 92.04, 100.05, 102.01, 102.02, 102.04, 106.03, 106.04, 106.11; 370/312–314, 321, 324, 326

(56) References Cited

U.S. PATENT DOCUMENTS

| | | | | |
|---|---|---|---|---|
| 5,588,005 A | * | 12/1996 | Ali et al. | 370/346 |
| 5,691,980 A | * | 11/1997 | Welles et al. | 370/316 |
| 5,790,536 A | * | 8/1998 | Mahany et al. | 370/338 |
| 5,949,776 A | * | 9/1999 | Mahany et al. | 370/338 |
| 6,389,010 B1 | * | 5/2002 | Kubler et al. | 370/353 |
| 6,484,082 B1 | * | 11/2002 | Millsap et al. | 701/48 |
| 6,570,857 B1 | * | 5/2003 | Haartsen et al. | 370/312 |

FOREIGN PATENT DOCUMENTS

JP     2000-134212     5/2000

OTHER PUBLICATIONS

Communication from a Foreign Patent Office.
Sumit Garg, et al., "MAC Scheduling Policies for Power Optimization in Bluetooth: A Master Driven TDD Wireless System" VTC 2000–Spring. 2000 IEEE 51$^{st}$. Vehicular Technology Conference Proceedings. Tokyo, Japan, May 15–18, 2000, IEEE Vehicular Technology Conference, New York, NY: IEEE, US vol. 1 of 3, May 15, 2000, pp. 196–200, XP000970607.
Indraneel Chakraborty, et al, "Policies for Increasing Throughput and Decreasing Power Consumption in Bluetooth MAC", 2000 IEEE International Conference on Personal Wireless Communications, Conference Proceedings, Dec. 17–20, 2000, pp. 90–94, XP010534019.

* cited by examiner

Primary Examiner—Binh Tieu
(74) Attorney, Agent, or Firm—Sughrue Mion, PLLC

(57) ABSTRACT

A wireless communication device and a controlling method thereof. The wireless communication device performing wireless communication includes a transceiver for transmitting and receiving data externally, and a controller for processing the data received from the transceiver, the wireless communication device operating as a slave that is connected to a master, the controller receiving a polling data addressed to the device from a master through the transceiver, and temporarily stopping the operation of the transceiver during a sleep period which is determined according to the number of other slaves connected to the master. Since the wireless communication device operated as an active slave can stop its data transmission/reception during a communication standby period, i.e., until the beginning of the next polling slot, the power consumption can be considerably reduced without affecting the communication itself.

7 Claims, 5 Drawing Sheets

WIRELESS COMMUNICATION DEVICE AND CONTROLLING METHOD THEREOF

BACKGROUND OF THE INVENTION

1. Field of the Invention

The present invention relates to a wireless communications device and a controlling method thereof, and more particularly to a wireless communications device operated as a slave that is capable of temporarily stopping an operation during an estimated communication pause period with a master.

2. Description of the Related Art

Generally, a portable wireless communications device uses a battery for power supply. Accordingly, the device can only be used for a limited time due to the limited power of the battery.

Research has been continuously performed into ways of extending the use time of portable wireless devices, and also into ways of reducing the size of the device for higher portability.

For example, one body of research suggests reducing the power consumption of the individual elements used in the wireless device, thereby reducing the power consumption of the device overall. This suggestion, however, has little advantage since not much power can be saved by current technology.

Meanwhile, another body of research underway is that of enhancing the charging efficiency of a battery by increasing the charging density without increasing the size of the battery, again with little success yet.

Since reducing the power consumption of the individual elements, or enhancing the charging efficiency of the battery are limitative and slow in developing, various methods are currently developed to reduce power consumption by controlling the operations of the communication device.

The controlling operation with respect to the communication device, for reducing power consumption, will be described below, taking Bluetooth communications as an example.

Generally, Bluetooth is a communication technology for transmitting data such as voice and video data within a distance of 10 m to 100 m at maximum speed of 1 Mbps. The Bluetooth devices that intercommunicate according to the Bluetooth standard are communicably connected with each other by processes like Inquiry, Inquiry Scan, Page, and Page Scan, or the like. According to respective roles in a network, the devices are determined to be a master or a slave. A piconet is constructed in such a manner that more than one slave is connected to one master.

A master and slaves perform bi-directional communication by a Time Division Duplex (TDD) technique.

According to the Bluetooth communication standard presently available, seven slaves can be actively connected to a master in a piconet for a mutual communication therebetween.

Once the slaves are connected to the master, the slaves can be operated in active, sniff, hold, or park modes.

Operations of the slaves in the respective modes will be described referring to FIGS. 1A through 1C.

First, referring to FIG. 1A, when the slave is in an active mode, the master sequentially transmits data to the slaves at predetermined slot intervals according to a predetermined link order. Here, reference characters M followed by increasing numeral subscripts are master-to-slave slots for the slaves of the corresponding link order.

The slave in the active mode receives data from the master during master transmission sections. If the data is addressed to the slave, the slave transmits data during the slot that is allocated after the master transmission section. In FIG. 1A, reference characters S followed by increasing numeral subscripts are slave-to-master slots for the slaves of corresponding link order.

In the active mode, the slave of zero link order, i.e., an active slave 0 receives the data addressed to the slave from the master, and transmits data during the slave-to-master slot (S0 in FIG. 1A). Then the slave is turned to reception mode, where the slave detects if the data addressed thereto is transmitted from the master. Here, the hatched portions of FIG. 1A are where the power is consumed for data transmission/reception. Since the active slave 0 needs to be operated in the reception mode even when data is transmitted from the master to the other slaves, unnecessary power is consumed.

Meanwhile, the activity time of the slaves for data transmission/reception in sniff mode is less than the activity time consumed by the active slaves, and the operation of the sniff slaves is shown in FIG. 1B.

As shown in FIG. 1B, a slave in a sniff mode, i.e., a sniff slave 1, communicates with a master after a predetermined offset (Dsniff) time and during a period of Nsniff_attempt of a sniff period (Tsniff).

Meanwhile, a slave in a hold mode, i.e., a hold slave 2 temporarily holds data transmission for a hold timeout duration, the time duration agreed with the master, and is turned to the active mode.

Lastly, as shown in FIG. 1C, a slave in a park mode, i.e., a parked slave 3, receives a slot broadcasted from the master for a beacon instant (TB), which starts at an interval of one or more beacon instants (TB). The parked slave 3 is turned into the active mode upon receiving an unpark message in a Scan section. When an unpark message is not received, the parked slave 3 remains in a sleep mode.

In order to minimize power consumption and optimize data processing by a dynamic power control using the sniff, hold, and park modes, necessary conditions for determining an optimum mode for the master and the slaves need to be regularly checked. That is, to identify necessary conditions for determining the optimum mode, such as communication traffic requested by the slaves and communication service types like voice communication or data communication, frequent communications between the master and the slaves are required. Accordingly, in addition to the time for data transmission, the time should be allocated for mode determination, and the efficiency of data transmission is deteriorated.

SUMMARY OF THE INVENTION

The present invention has been made to solve the above-mentioned problem, and accordingly, it is an object of the present invention to provide a wireless communication device and a controlling method thereof, capable of reducing power consumption for unnecessary data reception, without decreasing a data transmission rate.

To accomplish the above object, the wireless communication device according to the present invention includes a transceiver for transmitting and receiving data externally; and a controller for processing the data received from the transceiver, the wireless communications device operating as a slave that is connected to the master, the controller receiving a polling data addressed to the device from a master through the transceiver, and temporarily stopping the operation of the transceiver for a sleep period which is determined by the number of other slaves connected to the master.

For example, the controller calculates the sleep period by multiplying a predetermined time slot by a doubled number of the other slaves.

Further, the above object is also accomplished by a controlling method of a wireless communications device performing wireless communications according to the present invention, that includes the steps of i) detecting whether a polling data addressed to the device is received from a master; ii) transmitting data to the master when the polling data addressed to the device is received, and stopping data reception from the master for a predetermined sleep period; iii) identifying whether the sleep period has elapsed; and iv) repeating the steps i) and ii) at least once, when determining the sleep period has elapsed.

BRIEF DESCRIPTION OF THE DRAWINGS

The above object and other features of the present invention will become more apparent with reference to the accompanying drawings, in which.

DETAILED DESCRIPTION OF THE PREFERRED EMBODIMENT

Figure 2:
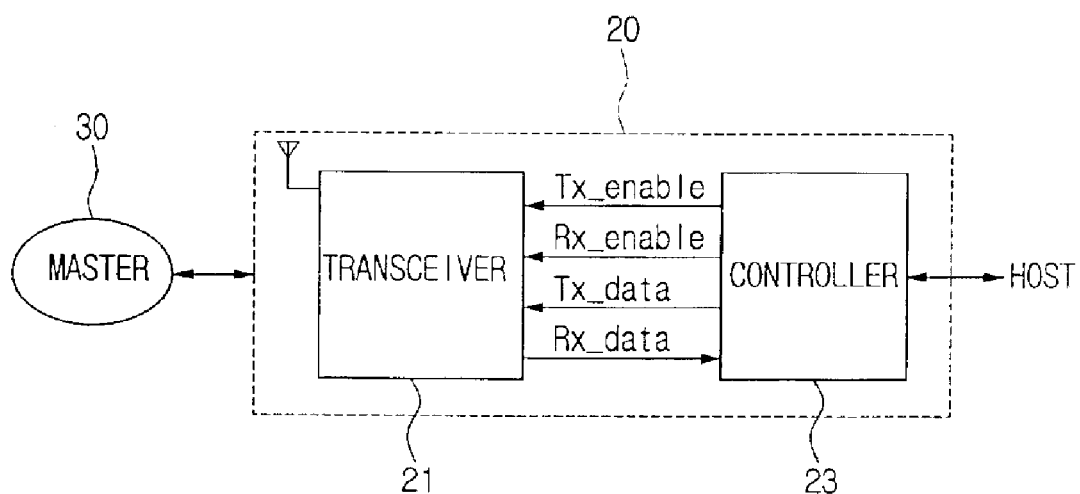
FIG. 2 is a block diagram showing a wireless communications device according to the present invention.

Referring to FIG. 2, a wireless communication device 20 includes a transceiver 21 and a controller 23.

The transceiver 21 processes externally-received wireless signals such as Radio Frequency (RF) signals, and wirelessly transmits signals.

The controller 23 is connected with a host through a communication interface. Here, a host is a communication terminal such as a laptop computer, cellular phone, etc.

The controller 23 processes signals requested by the host and processes signals received from the transceiver 21. That is, the controller 23 transmits data (Tx_data) to the transceiver 21, and processes data (Rx_data) received from the transceiver 21.

The controller 23 controls the operation of the transceiver 21. In FIG. 2, signal lines recorded in Tx_enable and Rx_enable are command signal lines for directing a transmission mode, a reception mode, or an operation hold of the transceiver 21.

In a wireless communication device 20 that is operated as an active slave, the controller 23 detects whether polling data is transmitted from the master 30 with an address thereto. If so, the controller 23 of the recipient slave device 20 transmits data to the master 30, and then stops the operation of the transceiver 21 to prevent power consumption during a predetermined sleep period.

Here, the polling data is sequentially transmitted from the master 30 to the respective slave devices connected with each other, in a predetermined order, for data communication therebetween. The polling data contains address information of the recipient slave device.

The sleep period is determined according to the information about the number of slave devices connected to the master 30, which is provided during or after a connection establishment with the master 30.

In addition to the information about number of slave devices connected with each other, for a more efficient determination of the sleep period, it is preferable for the master 30 to provide connection state information that includes the number of slots allocated to the respective slave devices, and the synchronous connection types of the slave devices corresponding to the number of slots.

The process of determining the sleep period will be described later in greater detail.

Figure 3:
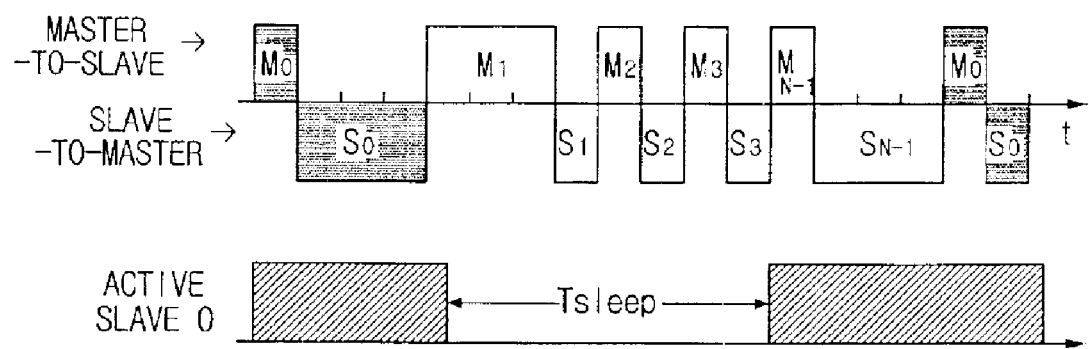
FIG. 3 is a timing diagram showing communication with a master when the wireless communications device of FIG. 2 is operated as a slave.

Referring to FIG. 3, operation of the wireless communications device 20 as an active slave will be described below.

Figure 1A:
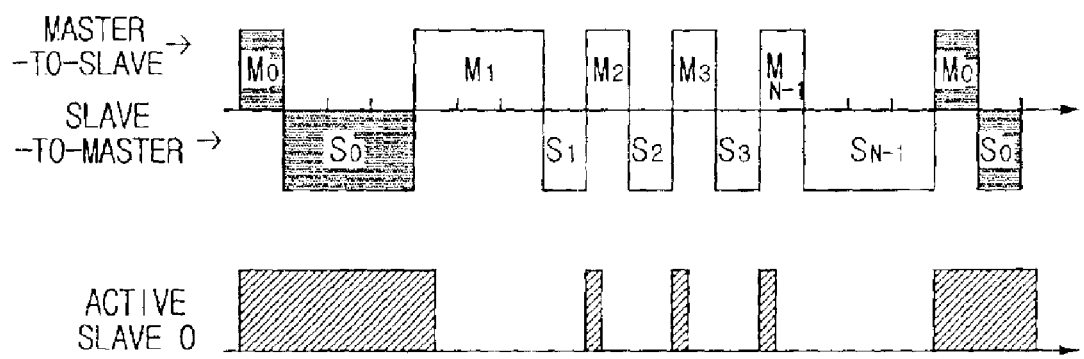
FIGS. 1A through 1C are timing diagrams showing an operation of a master and slaves according to connection modes in a Bluetooth communication scheme.
Figure 1B:
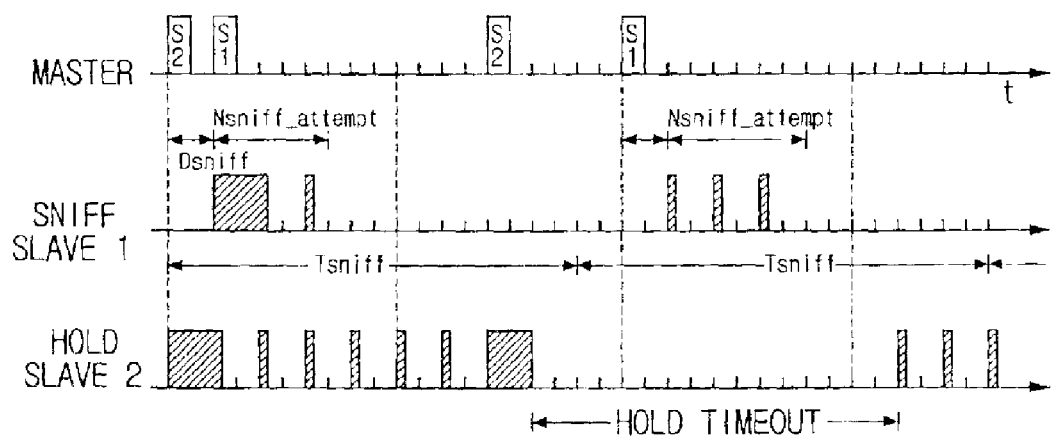
Figure 1C:
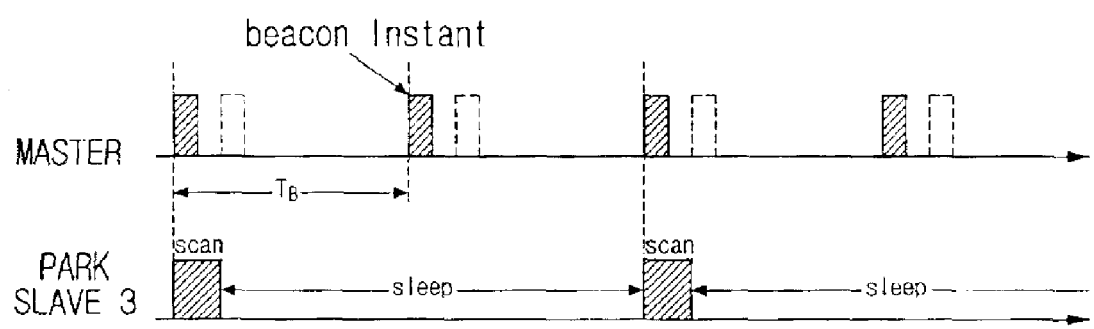

As shown in FIG. 3 and previously described referring to FIG. 1A, the master 30 sequentially transmits transmission data, i.e., polling data, in a round robinfashion. That is, the master 30 sequentially transmits the polling data according to a slave link order and at a predetermined slot interval.

In FIG. 3, the portions referred by a character M followed by increasing numeral subscripts (0 to N−1) are master-to-slave slots of a corresponding order.

A wireless communication device 20 operated as a slave device of zero link order is an active slave device 0. Upon receipt of the polling data addressed thereto from the master 30, the active slave device 0 transmits data to the master 30 during three (3) allocated slots ($S_0$).

Then, the active slave device 0 holds transmission/reception operation during an internally determined sleep period (Tsleep), and then wakes up to receive the polling data from the master 30 for the next cycle. In FIG. 3, the hatched squares indicate power consumption for data transmission/reception. The sleep period should be shorter than the interval from polling data reception to the next polling data reception for the next cycle.

Figure 4:
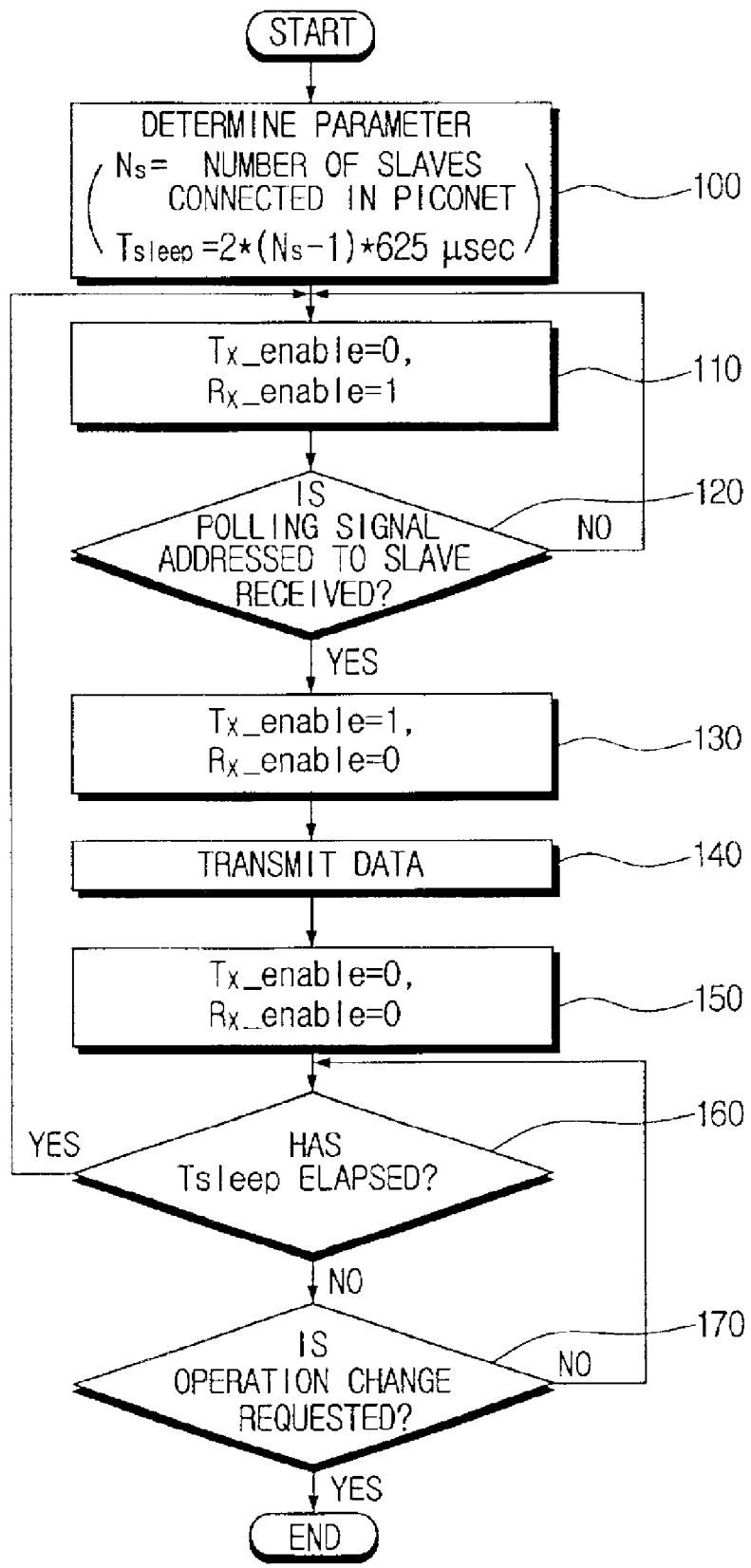
FIG. 4 is a flow chart showing an operation of a wireless communications device operated as an active slave according to the present invention.

The operation of the wireless communications device 20 as an active slave in a Bluetooth communication scheme will be described referring to FIG. 4.

First, during or after the connection establishment with other wireless communication devices, the wireless communications device 20 assigned as an active slave determines one of the operation parameters, i.e., a sleep period, by using the connection state information received from the master 30 (Step S100).

Meanwhile, in Bluetooth communication, 1, 3, or 5 slots are available for occupation according to the respective packet types. Here, if the slave device does not know the number of slots available to the respective slave devices, the slave device cannot estimate exactly when the next polling data will be transmitted thereto. As a result, the respective slave devices have to determine the sleep period on a minimum basis, so as to wake up and be turned to the reception mode in time for the next polling data.

The minimum sleep period for bi-directional communication between the master 30 and a plurality of slaves in a piconet corresponds to a doubled value of the number of slaves (Ns) being connected. Accordingly, provided that one cycle is a time period in which the slots are allocated to the respective slaves once by a Time Division Duplex (TDD) method, the minimum sleep period (Tsleep) for one slave is obtained by subtracting the number of slots allocated to one slave from the minimum number of slots allocated for one cycle. That is, the minimum sleep period (Tsleep) for one slave is obtained by Tsleep=2*(Ns−1)*time slot. Here, the time slot corresponds to 625μ second.

Meanwhile, if information about the number of slots allocated to the respective slaves in the piconet is available, the power consumption can be considerably reduced since the sleep period of each slave can be lengthened based on anestimation of the time when the next polling data addressed thereto will be transmitted from the master 30.

After the sleep period parameter is determined as above, the slave is operated in the reception mode, detecting whether the polling data is transmitted from the master 30 with the address thereto (Step S110). More specifically, the controller 23 outputs a transmission stop signal (Tx-enable=0) and a reception mode performing signal (Rx-enable=1). Here, the numbers 0 and 1 indicate operation stop and operation perform, respectively. The 'operation stop' means partially or entirely stopping the power supply to the respective elements performing the data transmission/reception.

If it is determined that the polling signal addressed to the is received in S120, the reception mode is stopped, and the transceiver 21 performs a transmission mode (Step S130). That is, the controller 23 outputs 0 and 1 to the transceiver 21 for Rx_enable signal and Tx_enable signal, respectively.

Then, data is transmitted to the master 30 during allocated slots (Step S140).

After completion of the data transmission, the slave is operated in the sleep mode (Step S150). That is, the controller 23 outputs 0 through Rx_enable and Tx_enable signal lines to stop operations of the transceiver 21. The controller 23 also counts time.

Next, it is determined whether the counted time by the controller 23 corresponds to the predetermined sleep period (Step S160). If the counted time corresponds to the sleep period, the slave is returned to S110 to perform the reception mode in which the slave wakes up.

The steps S110 through S160 are repeated unless change requests for operation conditions occur, such as a change of the piconet connection state, i.e., change of the number of slaves connected to the piconet, receipt of an operation stop command from the host, or turn off of the power supply, or the like.

Next, it is determined whether a request is made from the host or the master for changing the operational conditions (Step S170). If such a changing request is made from the host or from the master 30, the operation according to the parameter determined in S100 is ended.

Figure 5:
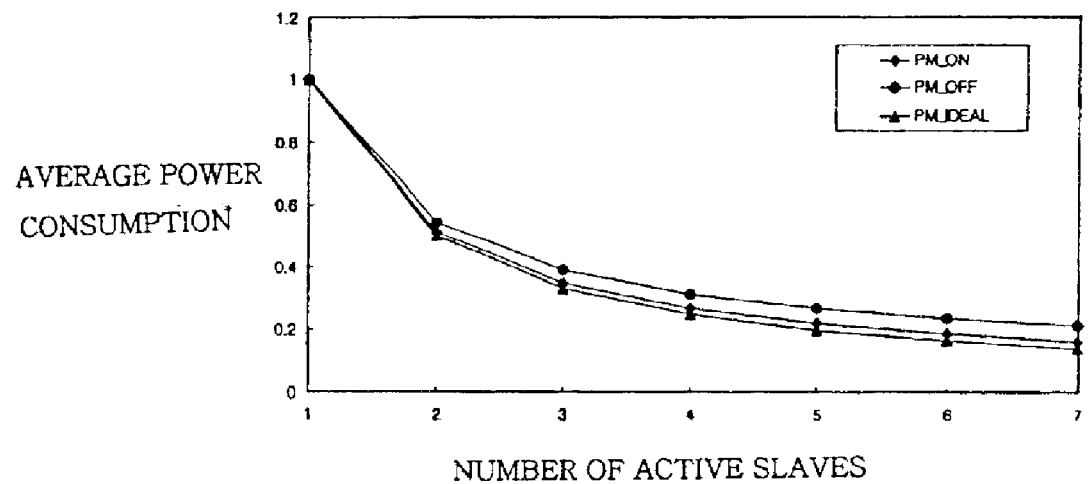
FIG. 5 is a graph illustrating power consumption by the wireless communications devices operated as active slaves according to the present invention, compared with the power consumption by the conventional active slaves.

The power consumption according to the number of slaves is shown in FIG. 5, in a case where the wireless communications device 20 connected to the master 30 is operated in the active mode.

According to the graph shown in FIG. 5, the transmission/reception power is 1 mW while a sleep mode power is 0 mW. The graph shows the power consumption pattern theoretically calculated according to the operation conditions for the case that the slots (S0, S1, S3, and Sn−1) are occupied by the slave as shown in FIG. 3.

PM_ON shows a power consumption pattern according to the number of slaves when the wireless communications device 20 is operated with the minimum sleep period.

PM_OFF shows a conventional power consumption pattern according to the number of slaves when the wireless communications device 20 as the active slave receives a polling slot addressed to the other slaves.

PM_IDEAL shows a power consumption pattern according to the number of slaves when the wireless communication device 20 is operated with the sleep period that is accurately calculated according to an exact estimation for the next polling point.

Provided that the probabilities of occupying one (1) slot is 0.8, occupying three (3) slots is 0.15, and occupying five (5) slots is 0.05, the power consumption in the operation condition of PM_ON is reduced by 15 to 24 percent from the operation condition of PM_OFF.

According to the wireless communications device 20 and the controlling method thereof as described above, since the wireless communications device 20 operated as the active slave can stop its data transmission/reception during a communication standby period, i.e., until the beginning of the next polling slot, the power consumption can be considerably reduced without affecting the communication itself.

In the drawings and specification, there have been disclosed typical preferred embodiment of the invention and, although specific terms are employed, they are used in a generic and descriptive sense only and not for purposes of limitation, the scope of the invention being set forth in the following claims.

What is claimed is:

1. A wireless communication device performing wireless communication, comprising:
 a transceiver for transmitting and receiving data externally; and
 a controller for processing the data received from the transceiver, the wireless communication device operating as a slave that is connected to the master, the controller for receiving a polling data addressed to the wireless communication device from a master through the transceiver, and temporarily stopping the operation of the transceiver for a sleep period which is determined by using the number of other slaves connected to the master.

2. The device as claimed in claim 1, wherein the controller calculates the sleep period by multiplying a predetermined time slot to a doubled number of the other slaves.

3. The device as claimed in claim 2, wherein the predetermined time slot corresponds to 625μ second.

4. The device as claimed in claim 1, wherein the master sequentially transmits the polling data according to a predetermined slave order, and the controller, upon receipt of the polling data addressed to the device, stops the operation of the transceiver for the sleep period after a completion of the data transmission.

5. A controlling method of a wireless communication device performing wireless communication, comprising the steps of:
 i) detecting whether a polling data addressed to the device is received from a master;
 ii) transmitting data to the master when the polling data addressed to the device is received, and stopping a data reception from the master for a predetermined sleep period;
 iii) identifying whether the sleep period has elapsed; and
 iv) repeating the steps i) and ii) at least once, when determining the sleep period has elapsed,
 wherein the step iv) is repeated based on whether a change occurs in a number of slaves connected to a piconet of the master.

6. A controlling method of a wireless communication device performing wireless communication, comprising the steps of:

i) detecting whether a polling data addressed to the device is received from a master;

ii) transmitting data to the master when the polling data addressed to the device is received, and stopping a data reception from the master for a predetermined sleep period;

iii) identifying whether the sleep period has elapsed; and iv) repeating the steps i) and ii) at least once, when determining the sleep period has elapsed, wherein the sleep period is calculated by multiplying the predetermined time slot to a doubled number of other slaves connected to the master, by using connection state information received from the master.

7. The method as claimed in claim 6, wherein the time slot corresponds to $625\mu$ second.

* * * * *